United States Patent [19]
Maimets

[11] Patent Number: 5,235,788
[45] Date of Patent: Aug. 17, 1993

[54] ENCLOSURE ASSEMBLY AND METHOD OF CONSTRUCTING SAME

[76] Inventor: Lembit Maimets, 39 Rivercourt Blvd., Toronto, Ontario, Canada, M4J 3A3

[21] Appl. No.: 564,068

[22] Filed: Aug. 8, 1990

[51] Int. Cl.[5] .................. E04H 12/18; B64G 1/12
[52] U.S. Cl. .................. 52/108; 244/159; 29/446; 428/906
[58] Field of Search ......... 52/108; 416/142 R, 142 A, 416/142 B; 156/118, 121; 264/314, 315, 326; 244/159, 162, 173; 29/446, 452, 454; 428/906

[56] References Cited

U.S. PATENT DOCUMENTS

| | | | |
|---|---|---|---|
| 2,905,282 | 9/1959 | Miller | 52/108 |
| 3,144,215 | 8/1964 | Klein | |
| 3,165,751 | 1/1965 | Clark | |
| 3,169,725 | 2/1965 | Berglund | |
| 3,243,132 | 3/1966 | Taylor et al. | |
| 3,348,352 | 10/1967 | Cummings | |
| 3,349,526 | 10/1967 | Schuster | |
| 3,357,457 | 12/1967 | Myer | |
| 3,465,986 | 9/1969 | Milly | |
| 3,473,758 | 10/1969 | Webb | |
| 3,503,164 | 3/1970 | Berry et al. | 52/108 |
| 3,582,020 | 6/1971 | Wrench | |
| 3,707,170 | 12/1972 | Mazuir | 52/108 X |
| 3,811,633 | 5/1974 | Cummings | |
| 4,122,991 | 10/1978 | Johnston et al. | |
| 4,237,662 | 12/1980 | Kinzler | |
| 4,730,797 | 3/1988 | Minovitch | |
| 4,991,784 | 2/1991 | Schmid | |

FOREIGN PATENT DOCUMENTS 0319921 6/1989 European Pat. Off. .

OTHER PUBLICATIONS

NASA/MFSC Contract NAS8-34677 Executive Summary, vol. 1, Oct., 1983, USA, pp. 1-24; Rockwell International Co.: "Development of Deployable Structures for Large Space Platform Systems".
Research Report, Avco-Everett Research Laboratory, entitled "Plasma Radiation Shielding for Astronauts".

*Primary Examiner*—David A. Scherbel
*Assistant Examiner*—Robert Canfield
*Attorney, Agent, or Firm*—Sandler Greenblum & Bernstein

[57] ABSTRACT

A method and apparatus for assembling an enclosure, in which the assembly includes a coil of material adapted to be uncoiled to an assembling position. The material can be prestressed to become at least transversely curved in the uncoiled assembling position. In a particular embodiment, the material is also prestressed to curve longitudinally, as the coil is unwound to form a toroidal shape. Further, the assembly can include a plurality of elements positioned within the coil, the elements having a size and shape enabling them to be adapted to be affixed to respective parts of the assembly within the enclosure in respective positions along the length of the material in the uncoiled assembling position to constitute an internal structure for the enclosure. The plurality of elements are coiled with the coil of material for permitting access to the elements for assembling them after the material is uncoiled. The enclosure is adapted to be used in space or terrestrially, on land or underwater, and can be appropriately sealed and pressurized.

56 Claims, 11 Drawing Sheets

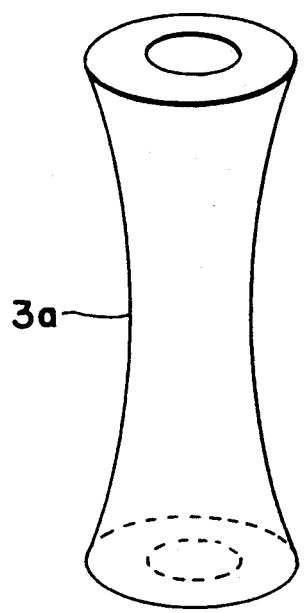
Fig-3c
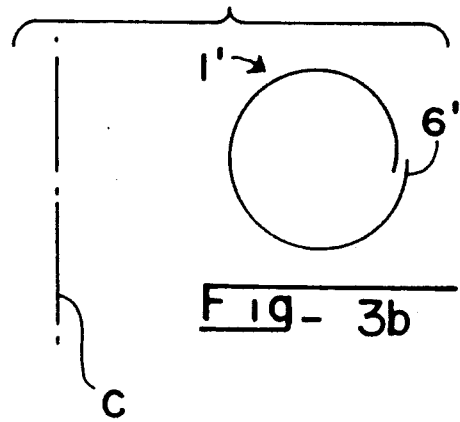
Fig-3b
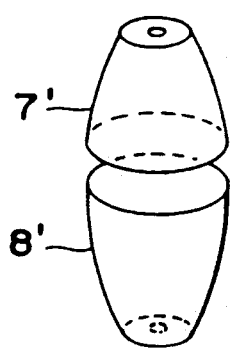
Fig-3e
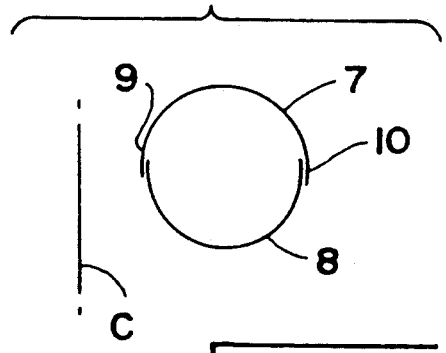
Fig-3d
Fig-3g
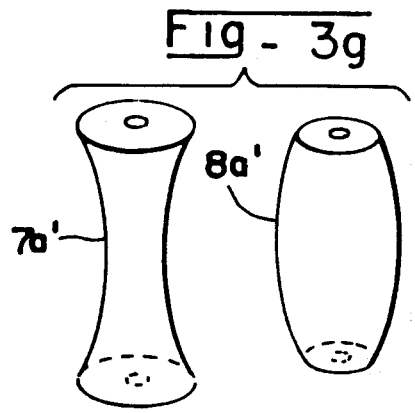
Fig-3f
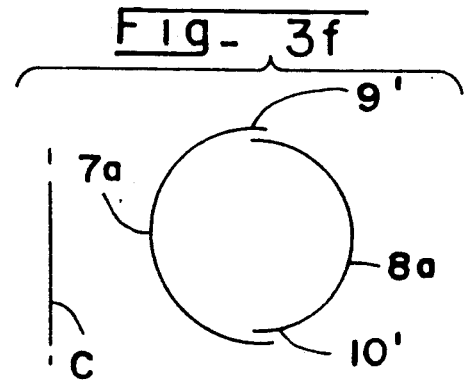

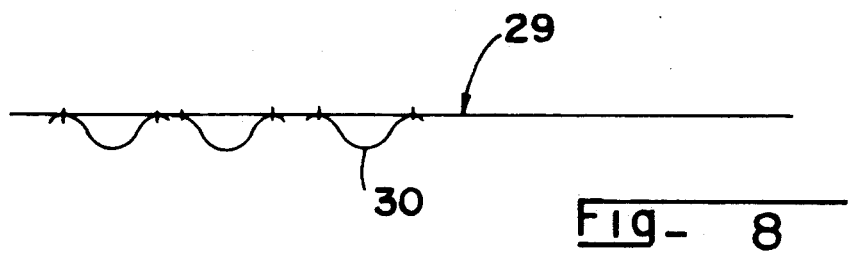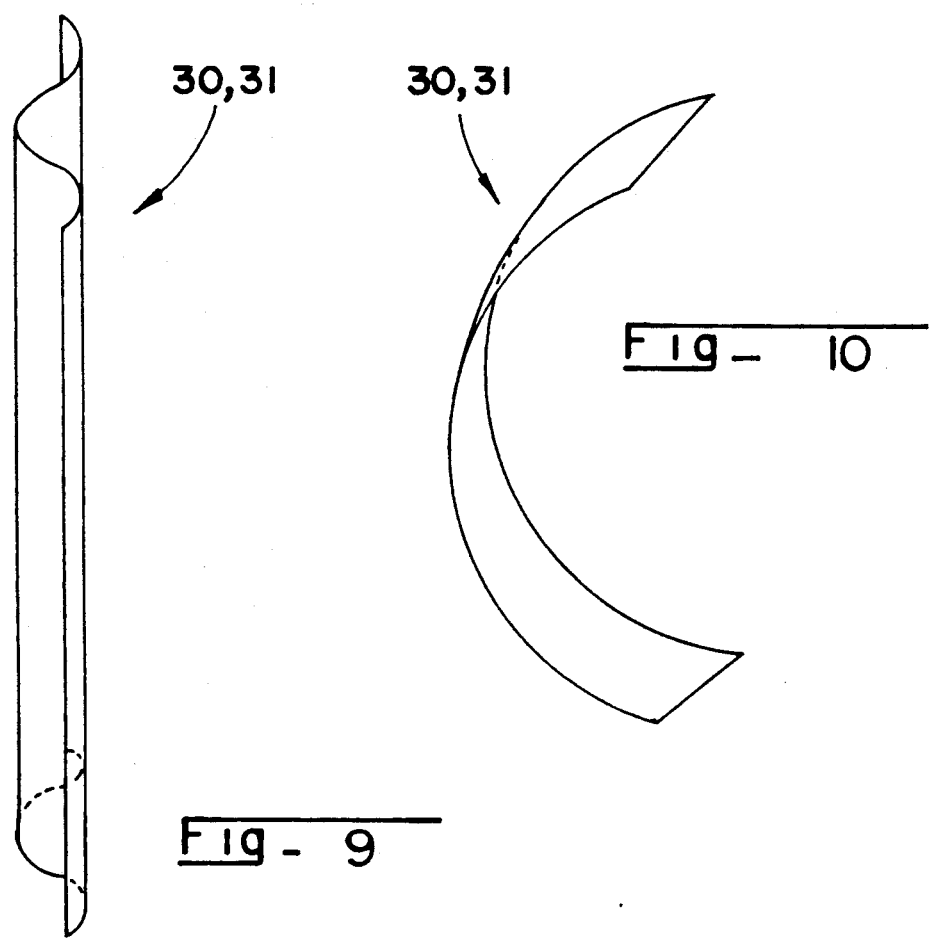

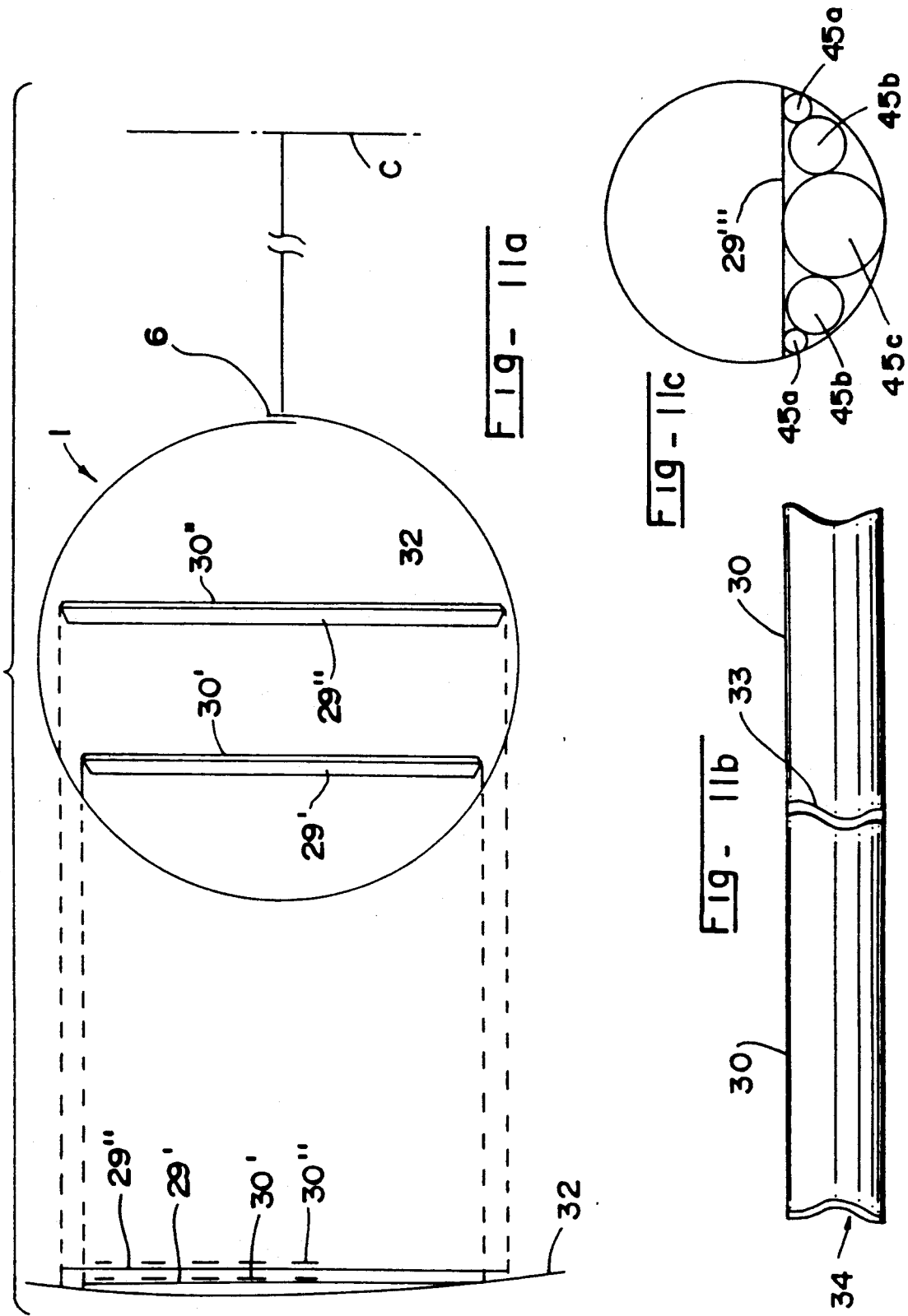

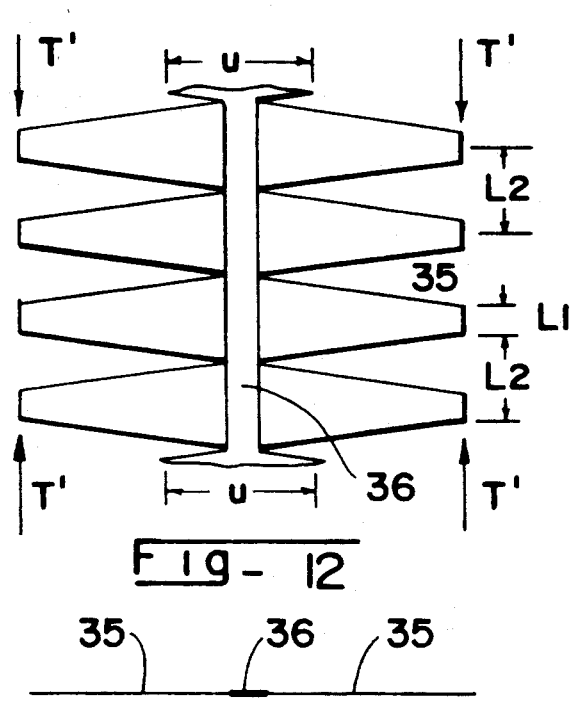
Fig-12
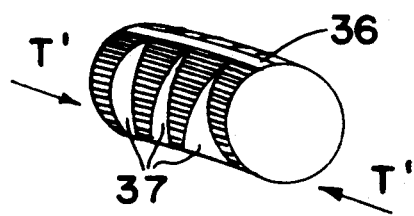
Fig-13
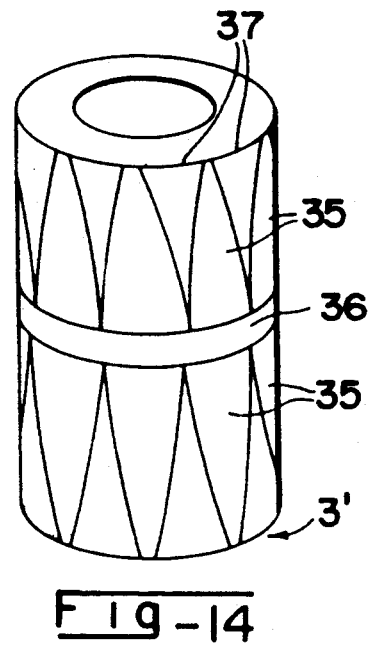
Fig-14
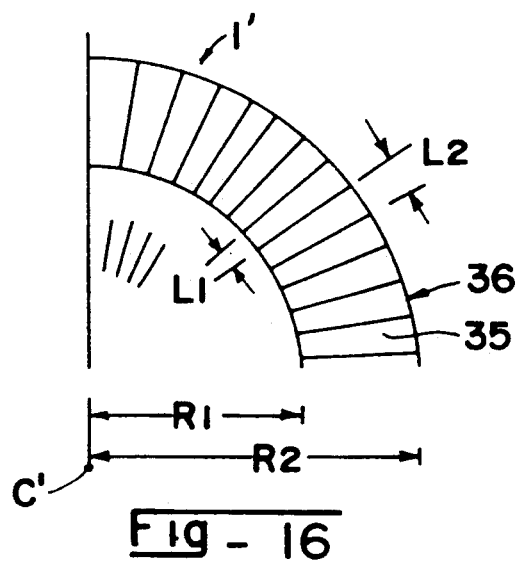
Fig-15
Fig-16

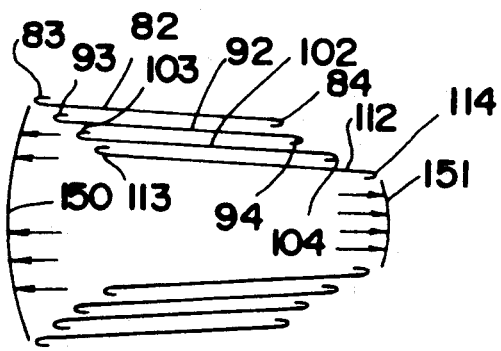
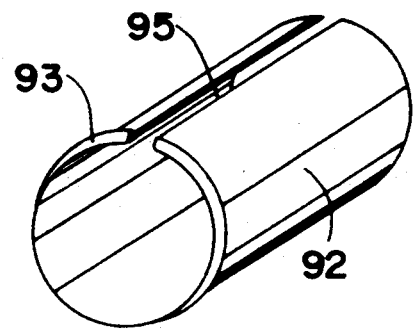
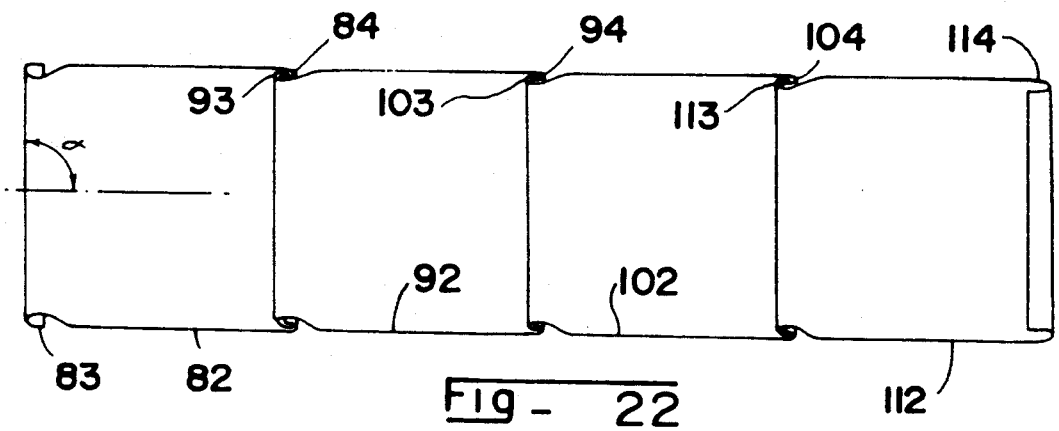
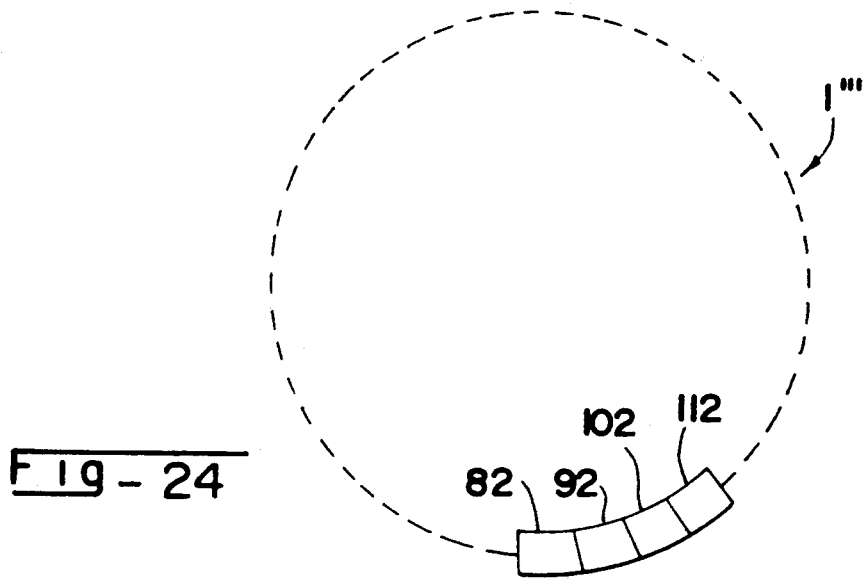

ENCLOSURE ASSEMBLY AND METHOD OF CONSTRUCTING SAME

BACKGROUND OF THE INVENTION

1. Field of the Invention

The present invention relates to an enclosure, such as a habitat for use in earth orbit, for example, as well as for use in terrestrial environments, on land or underwater. The present invention also relates to the method of constructing the enclosure.

2. Description of Background and Other Information

In the art of building structures, economy and efficiency are usually sought in the selection of the materials used and the methods employed in construction. For example, in both residential and commercial construction, it is known to utilize prefabricated components, factory-assembled, e.g., which are then transported to the construction site and appropriately arranged in a predetermined manner to complete the building structure. The structure is thereby produced in the minimal amount of time, but at a predetermined level of quality, usually mandated by regulation or code.

When building structures are designed for use in space, efficiency and economy are likewise sought and are even more critical. Indeed, due to the cost of transporting building materials and components to a space location, it is important that the method of construction be as efficient as possible. Ease of deployment and assembly, not material and strength factors, are most important. On the one hand, the cost and practicality of transporting relatively large preassembled components to a space location, which can be assembled in a relatively minimal amount of time, has to be balanced with the cost and practicality of merely transporting the necessary building materials to such a space location, which would then be used in construction of the structure in a relatively greater amount of time.

In either case, a primary constraint is the limitation in the size and weight of the payload, comprised of the necessary materials and/or components that can be transported to the space location, and the cost of transporting the payload. For example, the cargo capacity of the transport vehicle used would constrain the size of any given component. Necessarily, therefore, it is an objective to produce a relatively compact and lightweight payload during transportation, yet one which is comprised of the necessary materials and/or components for efficiently completing the enclosure, whether a habitat for human occupation or other enclosure for storage, support or other function.

In the United States, a presently planned space station design, which itself is already at least a second generation design, is planned to be constructed in eighteen components assembled on earth and transported to earth orbit, at an altitude of about 250 to 300 miles (403 to 483 kilometers), and assembled together during 28 space shuttle missions. The design includes, as the constituent foundation, two major structural beams, each about 360 feet (110 meters) in length and parallel to one another, which are crossed at an intermediate point, by another beam, about 400 feet (122 meters) in length. The two parallel beams are closed at their ends by smaller length beams to form two large box-like areas. Various modules for docking, habitation, experimentation, etc. are to be affixed to the structural framework. Construction of the structure is expected to begin in March, 1995 and is expected to be completed in four and one-half years.

At a currently projected cost of $37 billion, the U.S. structure is under critical Congressional review and critics contend that it is overweight, underpowered, and may require more frequent space shuttle flights than projected to complete the assembly. These critics cite the complexity of the present design as a significant problem. For example, thousands of different pieces are necessary to be assembled, which have been compared to pieces of a giant jig-saw puzzle, which are difficult to fit together properly.

SUMMARY OF THE INVENTION

It is therefore an object of the present invention to enable the construction of an enclosure, which is assembled from a relatively compact assembly of materials for transportation, but which enables a relatively simple and efficient construction at a building site.

To this end, the apparatus of the present invention includes a quantity of material movable between a coiled transport position to an uncoiled assembling position, wherein the quantity of material is adapted to form a coil. The quantity of material includes a first end portion which, in the coiled transport position, is located within an interior of the coil of material, a second end portion which, in the coiled transport position, is located on an exterior of the coil, and a pair of edge portions longitudinally extending between the first end portion and the second end portion. The material has a shape and a flexibility such that, as the quantity of material moves from the coiled transport position to the uncoiled assembling position, the material becomes transversely curved and longitudinally curved.

Preferably, the material is elastic, whereby, as the quantity of material moves from the coiled transport position to the uncoiled assembling position, the material becomes transversely curved due to elastic recovery of the material.

In a particular embodiment of the invention, each of the edge portions includes a series of cut-outs in the coiled transport position of the quantity of material, forming a series of spaced apart ribs In this embodiment, the apparatus further includes means for moving the series of spaced apart ribs together on each respective edge portion in the uncoiled assembling position of the quantity of material. Further, the material includes a generally centrally positioned longitudinally extending spine, the ribs extending in a transverse direction from the spine.

Further according to this embodiment, the means for moving the series of spaced apart ribs together includes at least one cable uniting the series of ribs on each respective side of the material.

Further according to the invention, the transversely and longitudinally curved material is adapted to generate a toroid by the edge portions being connected together, thereby forming the enclosure.

In a variation of a particular embodiment of the invention, the transversely and longitudinally curved material is adapted to generate a semi-toroid, whereby a plurality of the coils of material are adapted to form a toroid by respective ones of the edge portions of respective ones of the coils being connected together, thereby forming the enclosure.

According to a particular aspect of the invention, the edge portions are adapted to be overlapped, the apparatus further including means for facilitating connection of the edge portions.

More specifically according to this feature of the invention, the means for facilitating connection of the edge portions includes a plurality of grip hook members extending from one of the pair of edge portions and a complementary plurality of grip slots located in the other of the pair of edge portions for receiving respective ones of the grip hook members.

Still further, the means for facilitating connection of the edge portions further includes providing the pair of edge portions with complementary corrugations in transverse cross section. In addition, a contact adhesive is adapted to be placed between the overlapped edge portions.

Still further, each of the pair of edge portions has a respective terminal edge, and the plurality of grip hook members extend in a transverse direction away from the terminal edge of the one edge portion to thereby increase a holding force of the plurality of grip hook members within the grip slots in response to a force tending to move the overlapped edge portions apart.

According to a particular feature of a particular embodiment of the present invention, in the coiled transport position, the coil of the material generally forms a cylinder having a cross-sectional dimension which increases in a direction from either of two ends of the cylinder toward a central portion of the cylinder.

The material from which the toroidal tubular enclosure of the present invention is made can be a metal, such as aluminum or an aluminum alloy, spring steel, cold rolled steel, or a plastic.

The present invention further includes a floor and a rigidifying structure for the floor, including a plurality of elements adapted to be assembled within the enclosure. If desired, a second floor or additional floors, generally parallel to the floor, can also be added.

Further according to the invention, the enclosure includes an interior surface having opposite side walls, wherein the floor includes at least one flat member extending from one of the opposite side walls to another of the opposite side walls, and wherein the rigidifying structure for the floor includes a plurality of joists adapted to be positioned to rigidify the floor.

Still further according to the invention, the rigidifying structure for the floor includes a plurality of floor joists adapted to be affixed to the floor and a plurality of end joists adapted to be affixed to the interior surface of the enclosure and adapted to be affixed to the floor joists.

According to a particular feature of the present invention, the generally flat member and the plurality of joists are adapted to be positioned within the coil to longitudinally curve and to transversely flatten from the generally corrugated cross-sectional shape. Further, each of the plurality of joists can have a predetermined length and a generally corrugated cross-sectional shape.

In a particular preferred embodiment, the plurality of joists includes a longitudinally extending quantity of a unitary material formed with weakened areas for defining the joists, whereby the joists are adapted to be separated from the unitary material at the weakened areas.

In a particular use of the enclosure of the invention, the enclosure is capable of being used as a satellite and the coil of material has a length less than or equal to 18.3 meters and a maximum diameter of less than or equal to 4.6 meters.

In a specific embodiment of the invention, the coil of material is adapted to be uncoiled for use in constructing an enclosure, the material being prestressed to become transversely curved and longitudinally curved in the uncoiled assembling position. Specifically, the material is prestressed to generally form a toroidal shape in the uncoiled assembling position.

It is a further object of the present invention to provide an assembly of parts capable of being assembled in constructing an enclosure, the assembly including:

a coil of material adapted to be uncoiled to an assembling position, the coil having a predetermined length and a predetermined diameter along the length, the material being prestressed to become transversely curved in the uncoiled assembling position; and a plurality of elements positioned within the coil, the plurality of elements having a size and shape enabling the elements to be adapted to be affixed to respective parts of the assembly within the enclosure in respective positions along the length of the material in the uncoiled assembling position of the material to constitute an internal structure for the enclosure, whereby the plurality of elements are coiled with the coil of material for permitting access to the elements for assembly of the elements to the respective parts as the material is uncoiled to the assembling position.

It is a further object of the present invention to provide a method of assembling an enclosure with the use of at least one coil of material, the material having a pair of longitudinally extending edge portions extending between opposite end portions, the material being prestressed to curve transversely and longitudinally in an uncoiled assembling position, the method including:

(a) uncoiling the material to form a transversely and longitudinally curved shape; and (b) connecting edge portions of at least the one coil to form a toroidal shape.

More specifically, the step of connecting the edge portions of the at least one coil includes positioning the grip hook members within the grip slots.

Still further according to the method of the present invention, the step of connecting the edge portions includes applying an adhesive to respective surfaces of the edge portions.

In another aspect of the method of the invention, air is transmitted to within the toroidal shape. By adding air to the enclosure, the force retaining the grip hook members within the grip slots is increased.

In an additional aspect of the method of the present invention, a floor and a rigidifying structure for the floor are assembled within the toroidal shape.

In particular, the step of assembling a floor and the rigidifying structure includes the step of uncoiling the material for gaining access to the floor and the rigidifying structure, which had been located within the coil.

In a preferred embodiment, the rigidifying structure includes a plurality of joists which includes a longitudinally extending quantity of a unitary material formed with weakened areas for defining the joists, wherein the step of assembling a floor and a rigidifying structure includes separating the joists from the unitary material at the weakened areas.

In an additional embodiment of the invention in which a plurality of tubular toroidal enclosures are utilized for forming a composite toroidal enclosure, the method further includes forming a plurality of toroidal shapes by performing the initial two steps mentioned above repeatedly with a respective plurality of coils of material, and the method further including affixing the plurality of toroidal shapes together.

In a still further embodiment of the invention, a toroidal enclosure is comprised of a plurality of telescopic sections which can be moved from a collapsed, telescoped assembly of tubular sections, for transportation, to an extended deployed assembly of sections which, when extended form the toroidal enclosure.

BRIEF DESCRIPTION OF THE DRAWINGS

The above and additional objects, characteristics, and advantages of the present invention will become apparent in the following detailed description of preferred embodiments, with reference to the accompanying drawings which are presented as non-limiting examples, in which:

FIG. 3b is a view, in transverse cross-sectional taken across the tubular toroid, of a variation of the embodiment of the invention shown in FIG. 3a, spaced from the toroidal axis;

FIG. 3c is a perspective view of a coil of material from which the variation shown in FIG. 3b is made;

FIG. 3d is a view, in transverse cross-sectional taken across the tubular toroid, of a further variation of the embodiment of the invention, made from a pair of semi-toroids;

FIG. 3e is a perspective view of the coils of material from which the variation shown in FIG. 3d is made;

FIG. 3f is a view, in transverse cross-sectional taken across the tubular toroid, of a still further variation of the embodiment of the invention;

FIG. 3g is a perspective view of the coils of material from which the variation shown in FIG. 3f is made;

FIG. 7b is a variation of the structure of FIG. 7a;

FIG. 8 is a partial cross-sectional view in elevation of the floor and rigidifying joists for the floor within the enclosure;

FIG. 9 is a perspective view of a joist for rigidifying the interior structure of the enclosure;

FIG. 10 is a perspective view of the joist of FIG. 9, illustrating the manner in which the joist curves longitudinally curves and at least partially flattens for being coiled with the material coil which forms the toroid;

FIG. 11a is a schematic view illustrating the manner in which the floor and joists are positioned with respect to the material forming the toroid and which is coiled with the material coil;

FIG. 11b illustrates a longitudinally extending member having weakened areas at which the joists are separated from one another;

FIG. 11c illustrates an alternate manner by which the floor is supported;

FIG. 12 is a partial plan view of an alternative embodiment for forming the toroidal enclosure;

FIG. 13 is an end elevation view of the material utilized in the alternative embodiment of FIG. 12;

FIG. 14 is a perspective view of the coil of material used in the embodiment of FIG. 12;

FIG. 15 is a partial perspective view of the uncoiled material of the embodiment of FIG. 12;

FIG. 16 is a partial plan view of the toroid of the embodiment of FIG. 12;

FIG. 21 illustrates, in transverse cross-section, a further alternative embodiment of the invention, in which a plurality of tubular members are telescoped for transportation;

FIG. 22 illustrates, in transverse cross-section, the embodiment of FIG. 21 in an extended, deployed position;

FIG. 23 illustrates, in perspective, one of the tubular members of the FIG. 21 embodiment; and FIG. 24 illustrates, in plan view, the formation of the toroidal enclosure by means of the deployed position of tubular members in the FIG. 21 embodiment.

DETAILED DESCRIPTION OF PREFERRED EMBODIMENTS

The present invention is directed to an enclosure which is contemplated to be used in space, within a body of water, or on land, and can be constructed in a number of alternative manners, as further described below.

Figure 1:
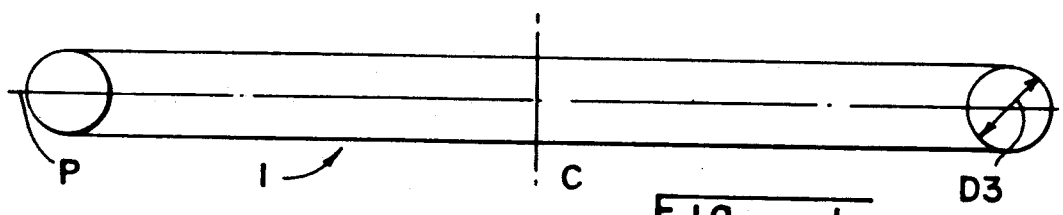
FIG. 1 is a schematic cross-sectional elevation view of the toroidal enclosure of the present invention.

In FIG. 1, a schematic cross-sectional view of the enclosure 1 of the invention is illustrated. As shown, the enclosure is generally toroidal in shape, having a central axis C and a toroidal plane P, perpendicular thereto. In a specific example, utilized presently, the diameter $D_o$ is approximately one (1) kilometer. In this example, the interior cross-sectional diameter $D_3$ of the tube is approximately ten (10) meters.

Figure 3A:
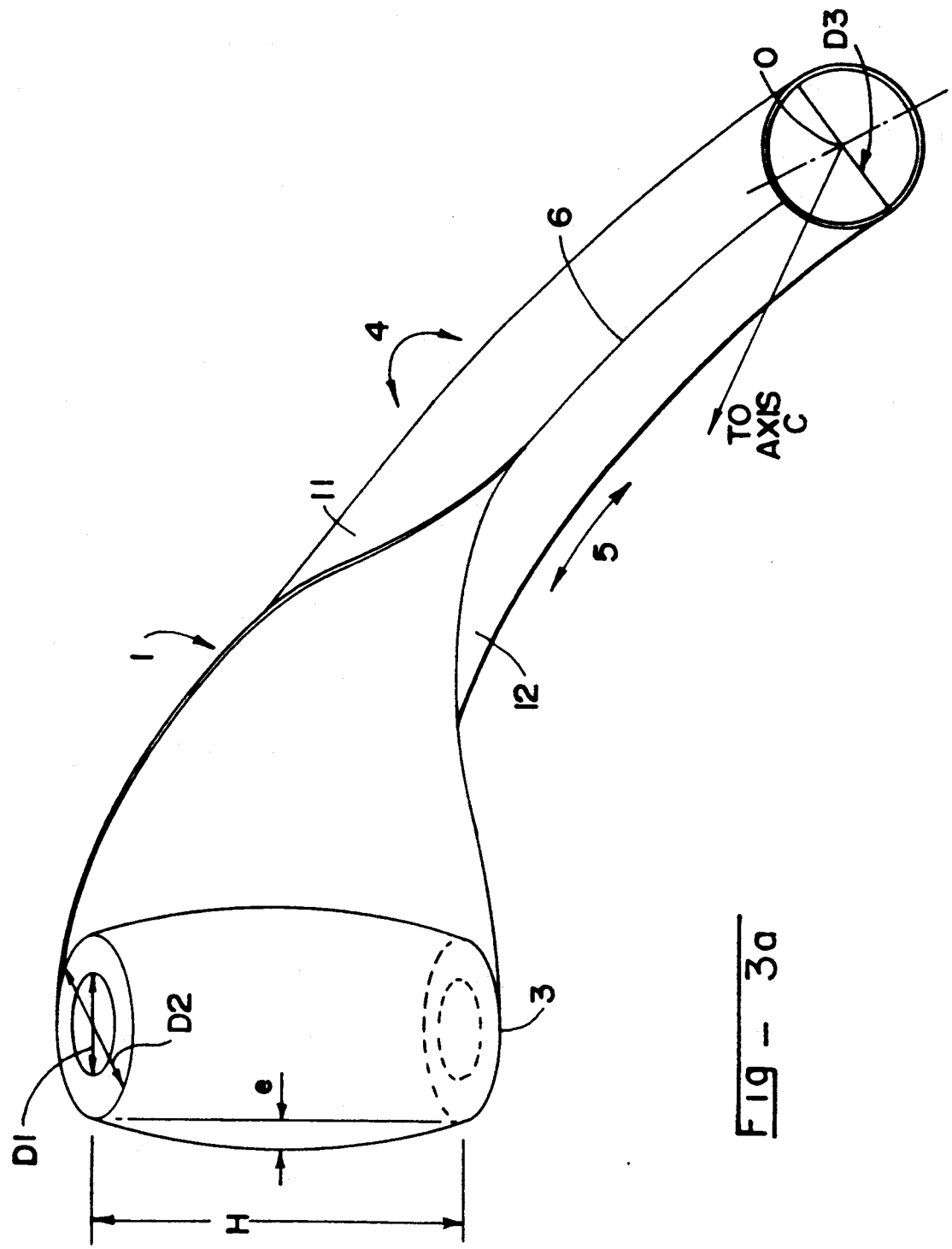
FIG. 3a is a perspective view of a coil of material, partially uncoiled, and which is utilized in a first embodiment of the invention, illustrating the manner in which the enclosure is created.

In view of the aforementioned objective of compactness for transportation described above, the constituent material from which the toroidal enclosure is constructed is coiled into a generally cylindrical configuration 3, as illustrated in FIG. 3a. In the example under discussion, the length H of the coil is approximately 31.4 meters. The material has a thickness of approximately five (5) millimeters, the average coil diameter is approximately 3.5 meters, and the material is coiled to form approximately 285.7 layers. On the other hand, it is contemplated that the enclosure of the present invention could be made of any desired size, including significantly smaller than that mentioned, to accommodate any desired application.

The material from which the toroidal enclosure is made can be either metal or plastic. As an example, aluminum or an aluminum alloy can be used, although spring steel or cold rolled steel could also be used.

In FIG. 3a, which shows the material partially uncoiled, the layers of the coil are located between outer diameter $D_2$ and inner diameter $D_1$. For the example under discussion, $D_1$ is approximately 2.79 meters and $D_2$ is approximately 4.20 meters, the material coil thereby having a thickness of approximately 1.41 meters.

In the embodiment of the invention illustrated in FIG. 3a, the material forming the coil is prestressed both transversely and longitudinally. That is, as the material is uncoiled, as shown in FIG. 3a, the inherent biasing, i.e., prestressing, of the material, by which the material elastically recovers, causes the material to curve transversely about tubular axis O, as indicated by the double headed arrow 4. In addition, as also shown in FIG. 3a, as the material is uncoiled, it is biased to curve longitudinally about central axis C, as indicated by the double headed arrow 5.

In the FIG. 3a embodiment of the invention, because the material is prestressed to curve longitudinally when the material is uncoiled a slight bulge exists when the material is coiled, as shown by dimension e. As shown, the outer diameter of the coil changes along the length of the coil 3 from an end, at diameter $D_2$, to a maximum diameter at a central portion of the coil, $D_2+2e$, to an opposite end, also at diameter $D_2$. The value of dimension e can be calculated by the following equation:
$e=(D_3 \cdot D_2)/(D_o - \frac{1}{2}D_3)$.

In the embodiment shown in FIG. 3a, to complete the tubular enclosure, a seam 6 is formed longitudinally around the toroidal enclosure 1 along the inner side of the toroid. The construction of the seam is discussed further below.

When used in an outer space environment, hundreds of miles (or kilometers) above the earth's surface, for example, the various steps in the assembly of the enclosure, described in further detail below, can be performed by outstretched robot arms and astronauts in self-propelled maneuvering units. The uncoiling of the material itself would occur automatically due to the internal stress, or prestress, in the material, once it is placed in position after being removed from containment in the transportation vehicle, by elastic recovery from the coiled position to the uncoiled position. The present invention is intended to provide a completed enclosure with a minimal number of operations, considering the environments in which the enclosure is contemplated to be assembled, viz., outer space or underwater.

As an alternative embodiment to that of FIG. 3a, the toroid can be formed to have the seam 6' located on the outer side of the toroid, as shown in FIG. 3b. In FIG. 3b only one transverse cross-section of the tubular enclosure 1' is shown, for simplicity, spaced from axis C.

In this embodiment, the material is prestressed to form a coil in the shape shown in FIG. 3c, i.e., a concave coil, rather than a convex coil, shown in FIG. 3a. An advantage of the embodiment of FIGS. 3b, 3c is that the seam can be sealed with a much greater force than in the embodiment of FIG. 3a, since the edges at seam 6' would not tend to move outwardly, away from each other, since such movement would be counter to the tension that would exist at the edges tending to retain the edges in a sealed position.

Further, at the inner side of the toroid of any of the embodiments disclosed herein, where the seam 6 is formed in the embodiment of FIG. 3a, the material might have a tendency to buckle, although this could be minimized or eliminated by appropriately controlling the magnitude of the prestress and the consequential toroid diameter. On the other hand, if buckling occurs at the inner side of the toroid upon completion of the assembly, the consequences are less significant in the embodiment of FIG. 3b, where there is no seam at the inner side.

FIG. 3d illustrates a modified form of the invention which can retain the aforementioned dimensions of the completed toroid, but which is designed for compatibility with the present configuration of the U.S. space shuttle. Specifically, the cargo bay of the shuttle is 60 feet (18.3 meters) in length and 15 feet (4.6 meters) in diameter. Therefore, the foregoing example of the present invention can be modified to be transported to earth orbit by the shuttle by forming the toroid from at least two coils 7', 8', each of which has a size such that the coils can be carried within the shuttle bay. Specifically, each coil can have a length of $\frac{1}{2}$H, i.e., about 15.7 meters. In this example, therefore, instead of the material being prestressed to the extent that the opposite edge portions are brought together to form a seam, each of the two coils 7', 8' forms a semi-toroid 7, 8, which are joined together at seams 9, 10 by means of any of the methods to be discussed below.

Further, the respective coiled configurations of the material from which the semi-toroids 7 and 8 are shown in FIG. 3e. As can be seen, each semi-toroid forms a coil having the shape identified by 7' and 8', which are identical, coil 8' merely being inverted to illustrate how two such coils would be utilized to form a single toroid. Upon the uncoiling of coils 7' and 8', a complete toroid is produced, having seams 9 and 10, formed along a diametrical plane of the toroid.

An alternative to the FIGS. 3d, 3e construction is shown in FIGS. 3f, 3g, which also contemplates the use of two coils. Unlike the FIGS. 3d embodiment, however, in FIG. 3f the seams 9' and 10' are formed, in transverse cross-section, along a line perpendicular to the toroidal plane P, by means of a pair of semi-toroids 7a and 8a. As shown in FIG. 3g, semi-toroid 7a is formed from a concave coil 7a' and semi-toroid 8a is formed from a convex coil 8a'. Since the coils 7a', 8a' form semi-toroids, rather than complete toroids, the magnitude of their respective convexity and concavity is not required to be as great as with the coils of FIGS. 3a and 3c.

The seams 6, 6', 9, 9', 10 and 10' between edge portions 11 and 12 of the uncoiled material shown in FIG.

Figure 4:
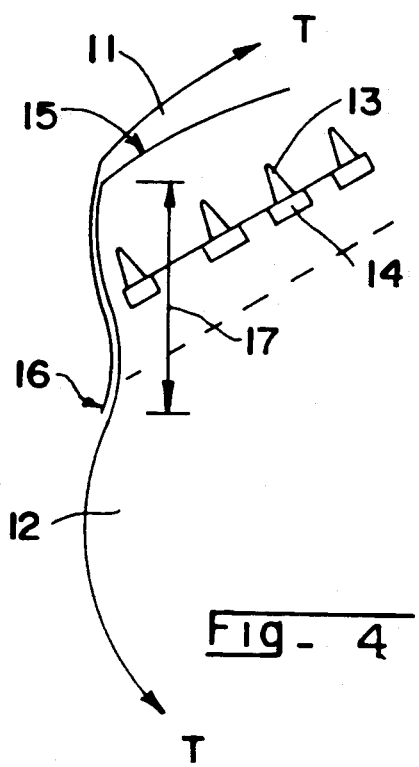
FIG. 4 is partial view of the tubular enclosure, illustrating a particular connection of the edge portions of the uncoiled material forming the enclosure.
Figure 5:
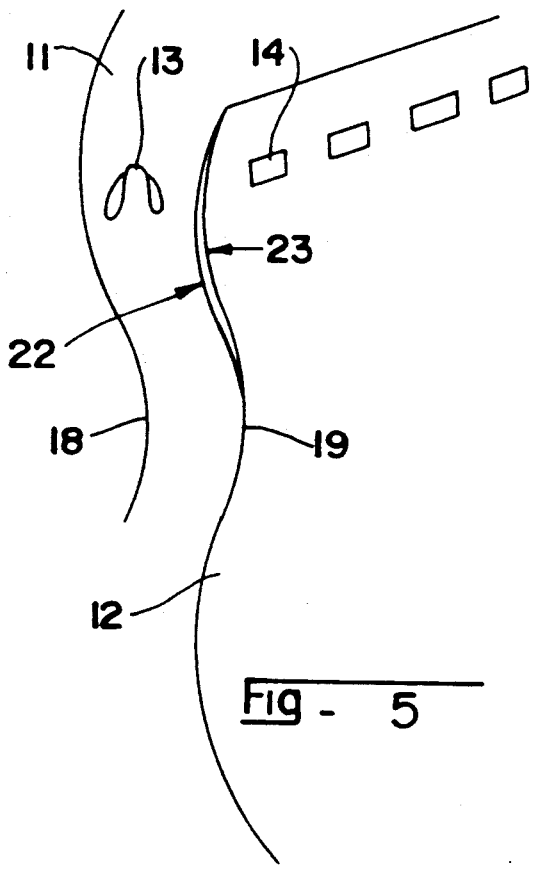
FIG. 5 is a partial view of the connection of FIG. 4, showing the edge portions slightly separated from each other.

3a, for example, can be effected by means of the grip hook members 13 and grip slots 14. As shown in FIGS. 4 and 5, grip hook members 13 extend inwardly of the enclosure and away from edge 15 of edge portion 11, transversely across the edge portion 11. Also, grip slots 14 are positioned transversely across the edge portion 12. As the toroidal enclosure is assembled together, i.e., as the coil 3 of material is uncoiled, the grip hook members 13 are inserted in respective ones of grip slots 14.

Figure 2:
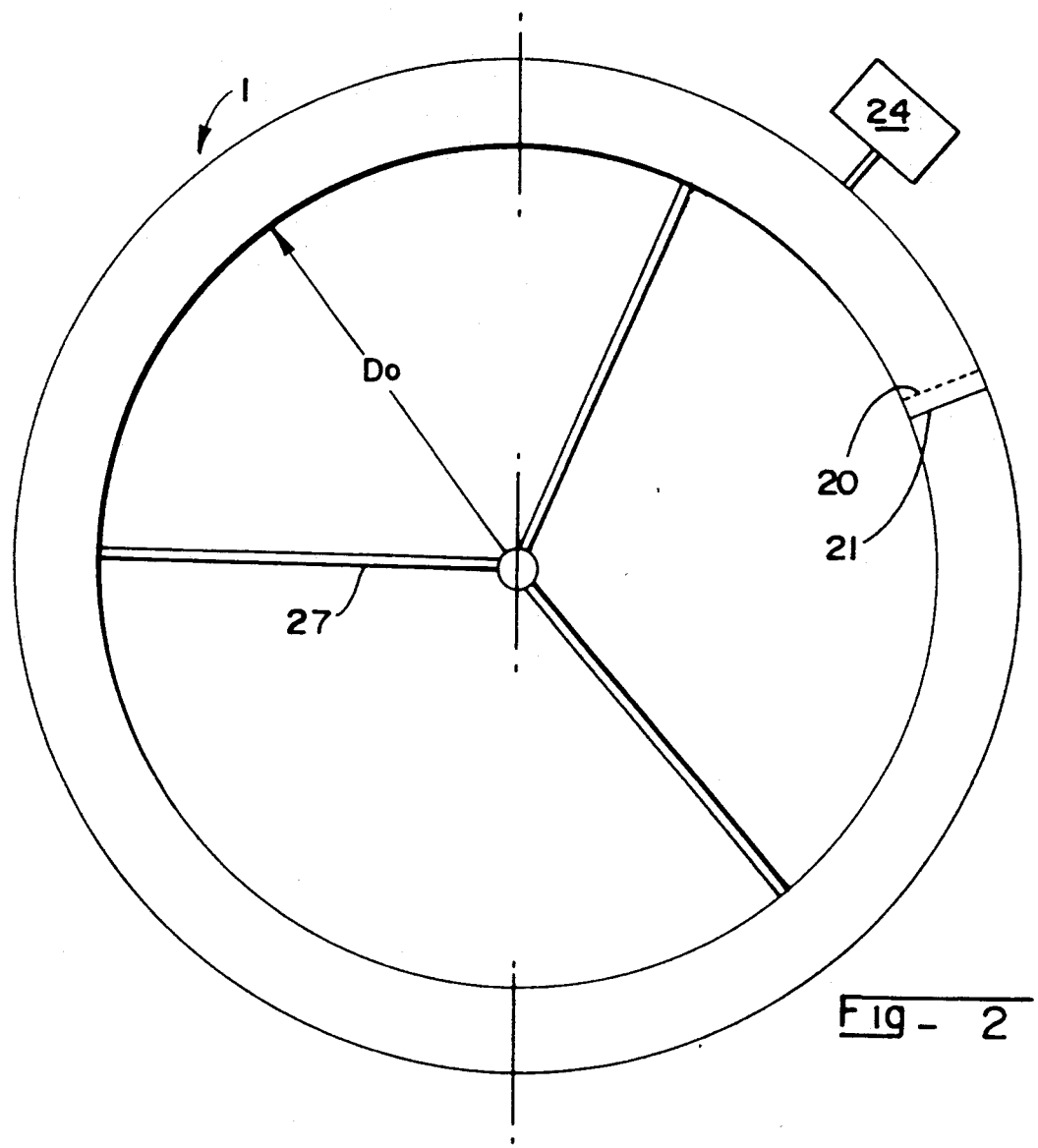
FIG. 2 is a schematic plan view of the enclosure shown in FIG. 1.

After the coil 3 is completely uncoiled, the toroidal enclosure 1, as shown in FIG. 2, is completed by placing end 20 of the material within end 21 to create a predetermined amount of overlap between ends 20 and 21. For this purpose, the interior of the tube, within end 21, can be slightly enlarged along the tube through a distance at least equal to the amount of overlap of the ends, as shown in FIG. 2, to accommodate the introduction of end 20 within end 21. In addition, a grip hook member/grip slot connection, as disclosed for the longitudinal seams, can be employed to effect a secure connection. FIG. 2 also illustrates that the coil of material 3 transversely and longitudinally curves in a generally continuous manner from one end 20 to the other end 21 to form a completely closed enclosure.

In the embodiment shown in FIGS. 4, 5, 6a, 6b, and 6c, the edge portions 11 and 12 are overlapped by an amount depicted by the double headed arrow 17 in FIG. 4. To further enhance the connection, the edge portions 11 and 12 are corrugated, as shown in FIGS. 4 and 5. Specifically, as shown in FIG. 5, in which the edge portions 11 and 12 are separated for clarity, a transversely extending corrugation 18 is formed in edge portion for registration within transverse corrugation 19, which is formed in edge portion 12.

Still further, and particularly for making the seam airtight for use in high altitudes or underwater, a contact adhesive tape 22 can be applied to one of the edge surface portions. As shown in FIG. 5, the adhesive tape 22 is applied to edge portion 12, the tape having a release surface 23. The tape at least completely covers the grip slots 14 to ensure that the seam is airtight.

After completion of the seams necessary to form the toroidal enclosure 1, the interior of the enclosure can be appropriately pressurized, by means of an appropriate air pressure source 24, as schematically depicted in FIG. 2, particularly if the enclosure is utilized in a space or underwater environment. In pressurizing the interior of the enclosure, the seams are secured and the rigidity of the enclosure is increased by creating a tension force T-T, schematically shown in FIG. 4, tending to pull the overlapped edge portions 11, 12 apart. However, due to the direction in which the grip hook members 13 extend, they are more greatly forced within the grip slots 14. Further, due to the particular placement of the adhesive on the corrugation of edge portion 12 and the mating of the adhesive with the particular surface of the corrugation 18 of edge portion 11, the force T-T also forces the adhesive surfaces together.

If desired, as also mentioned below, the tubular enclosure can be compartmentalized by further internal construction, each compartment being individually pressurized, with airlocks separating the compartments, for example.

Figure 6A:
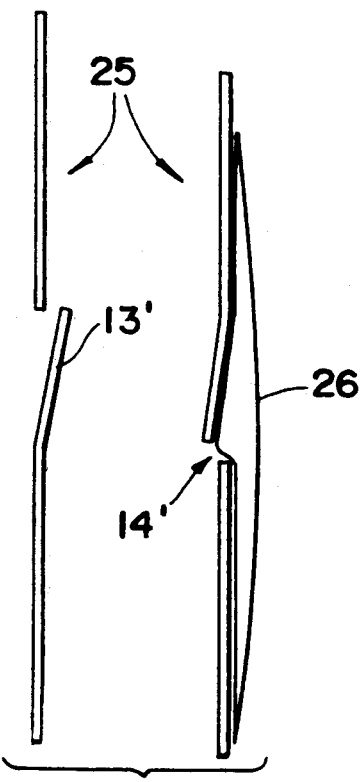
FIG. 6a is a partial view of a variation of the connection shown in FIGS. 4 and 5.

FIG. 6a illustrates, in cross section, an alternate embodiment of the grip hook members and grip hook slots. Therein, grip hook member 13' is shown on an edge portion of the material and a grip slot 14' is shown on a mating edge portion. The respective adhesive surfaces of the edge portions are indicated at 25. In this embodiment, which may or may not incorporate corrugations, a sealing membrane 26 is applied over the connection, after introduction of the grip hook members 13' within the respective grip slots 14' to ensure an airtight seal.

Figure 6B:
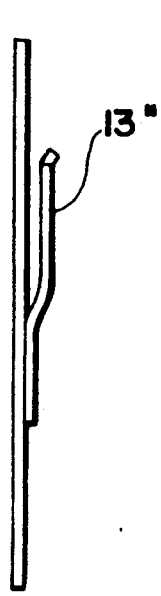
FIG. 6b is a partial view of a variation of the grip hook members of the connection.
Figure 6C:
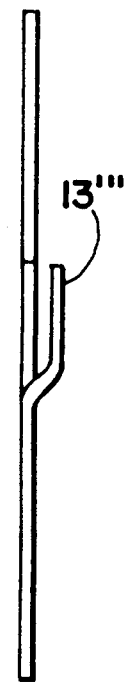
FIG. 6c is a partial view of another variation of the grip hook members of the connection.

FIG. 6b illustrates another embodiment of grip hook member, identified as 13", and FIG. 6c illustrates a further embodiment of grip hook member, identified as 13'''. In the embodiments of FIGS. 5, 6a, and 6c, the grip hook members are punched out of the material from which the enclosure is made. The holes resulting from the punching-out of the hook members can be covered with an airtight membrane to facilitate sealing. In FIG. 6b, the grip hook members 13" are affixed to the surface of the edge portion.

After completion of the toroidal enclosure, spokes 27 can be affixed to the interior of the toroid, radiating from axis C, as shown in FIG. 2. Spokes 27, exemplarily shown as three in number, can be made from any suitable construction, subject to the above-mentioned constraints of size and weight for transportation, e.g., when used in a non-terrestrial environment. As an example, coils of material, only transversely prestressed, could be utilized, to be uncoiled to form generally straight tubular beams.

Figure 7A:
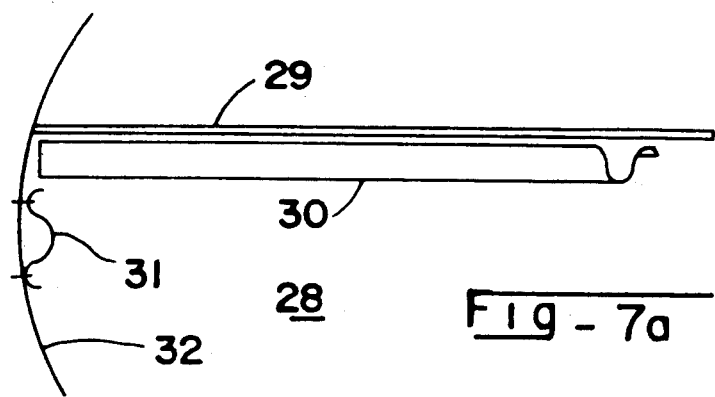
FIG. 7a is a partial schematic cross-sectional perspective view of the enclosure of the invention, illustrating a floor and a rigidifying structure for the enclosure.

In the interior 28 of the toroidal enclosure, a floor and a rigidifying structure for the floor can be constructed. In FIG. 7a, the floor 29 is shown to extend from one surface 32 of the enclosure interior 28 to the opposite interior surface (not shown in FIG. 7a). On one side of the floor 29, floor joists 30 are positioned, which also can extend from one interior surface 32 to the opposite interior surface and are preferably laid parallel to each other, as shown in FIG. 8, which is a schematic cross-sectional view of the floor 29 and floor joists 30.

As also shown in FIG. 7a, end joists 31 are attached to interior surface 32 and on an edge surface of which the floor joists 30 are affixed. The means of attachment can take the form of rivets or other well-known fastening means. A sealant can be used, if desired, at the attachment points to ensure airtightness. The cross-sectional shape of the floor joists 30 and end joists 31 are preferably corrugated, or sinusoidal, as depicted in FIGS. 7a-7e, 8, and 9.

Figure 7B:
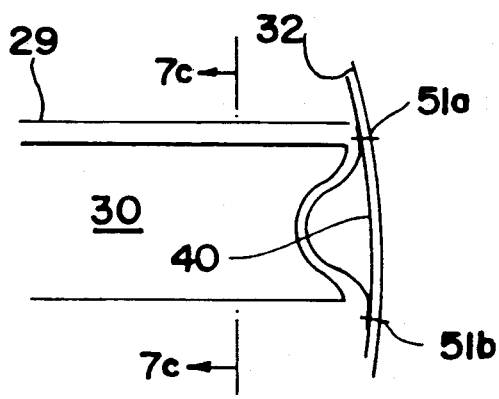

FIG. 7b illustrates a variation on the construction of FIG. 7a. Therein, a wall reinforcement element 40 is situated between the end joist 31 and the interior wall surface 32. The end joist 31 is affixed to the reinforcement element 40 by means of rivets 51a and 51b, shown in the upper and lower portions, respectively, of FIG. 7b. Although the floor joists 30 can be situated upon the upper edge of the end joist 31, as shown in FIG. 7a, the end of the floor joist can be complementarily formed, as shown in FIG. 7b, to accommodate the corrugated shape of the end joist. Appropriate fastening means, including adhesives, can be applied between the end joist and the floor joists, if necessary, to ensure the integrity of the connection.

Figure 7C:
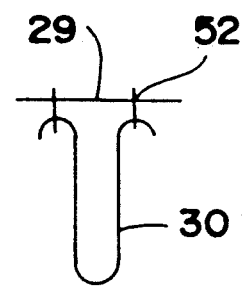
FIG. 7c is a transverse cross-sectional view, taken along lines 7c—7c of FIG. 7b.

FIG. 7c, which is a cross-sectional view of FIG. 7b, shows that the floor 29 can be attached to the floor joists 30 by means of rivets 52, or other convenient attachment means.

Figure 7D:
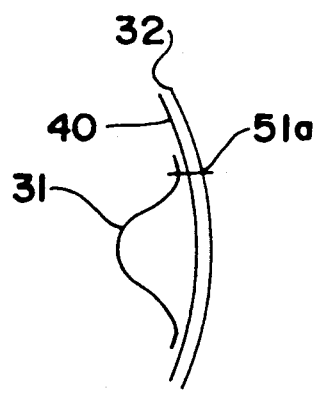
FIG. 7d illustrates a preassembled portion of the structure of the variation of FIG. 7b.

FIG. 7d illustrates a preassembled arrangement of the FIG. 7b variation, which is preassembled to the interior surface 32 before the coiling of the material prior to transportation to the assembly site. As can be seen in FIG. 7d, only the upper series of rivets 51a secure the end joist 31 to the reinforcement element 40, the lower rivets 51b are not affixed at this time, to permit the lower edge of the end joist to slide relative to the reinforcement element 40, due to the flattening of the end joist, described below in connection with FIG. 10, as the joist is coiled. After uncoiling of the material to form the toroid, the lower rivets 51b would be affixed, after the end joist assumes the unflattened shape shown in FIG. 7d.

Also as shown in FIG. 7d, the end joist 31 can be attached by means of upper rivets 51a both to the reinforcement element 40 and to the interior surface 32. Alternatively, the end joist 31 can be attached merely to the reinforcement element 40. In that event, the end joist 31 would be firmly affixed to the interior wall of the enclosure during assembling of the toroid with upper as well as lower rivets.

Figure 7E:
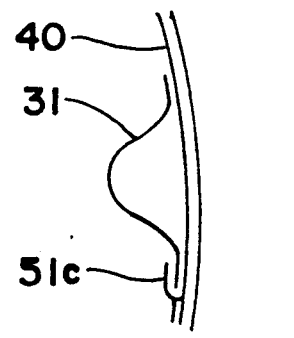
FIG. 7e illustrates a variation of the preassembled portion shown in FIG. 7d.

FIG. 7e shows a variation of the preassembled arrangement of FIG. 7d. In FIG. 7e, one edge of end joist 31, instead of being firmly affixed by rivets 51a, is positioned within guides 51c, which are preferably a series of longitudinally spaced elements, to locate the end joist 31 appropriately with respect to the interior surface, or reinforcement element, but which, compared to the FIG. 7d arrangement, permits an even greater freedom of movement during coiling of the material FIG. 9 illustrates, in perspective, a joist 30 (or 31), in a non-stressed condition. In FIG. 10, the joist is illustrated in a curved condition, as it would assume when coiled within coil 3, as is explained further below, with regard to FIG. 11a. In the curved condition of FIG. 10, the joist generally flattens from its sinusoidal, or corrugated, form shown in FIG. 9, due to the inherent flexibility of the material from which the joist is made. Preferably, the joists, as well as the floor, can be made from a flexible metal or plastic Aluminum or an aluminum alloy, spring steel, or a cold rolled steel can be used, for example.

FIG. 11a illustrates a cross-sectional view of the toroidal enclosure 1 having a first floor 29' and a second floor 29" affixed to the interior of the enclosure and rigidified by floor joists 30' and 30", respectively. The axis C about which the toroid is generated is shown to the right in FIG. 11a. Respective end joists are to be affixed to the interior surface 32 of the enclosure I, as previously described. To the left in FIG. 11, one layer of the coil 3 is shown, in which the two floors 29' and 29" and the various floor joists 30' and 30" longitudinally extend with the material from which the enclosure 1 is made. In addition, the appropriate end joists extend coextensively with the floors and the floor joists. Since the end joists are to be affixed to the interior surface 32 in the completed enclosure, they can be preassembled before coiling within the coil 3, if desired, as described above.

As shown in FIG. 1a, floor 29" has a greater width than floor 29', since floor 29" extends across a greater cross-sectional dimension of the tube of the enclosure. In the formation of the coil 3, as shown in the leftmost portion of FIG. 11a, the first floor 29', which can extend the full length of the toroid, is first laid against surface 32, upon which floor joists 30' are laid. Next, the second floor 29", which can also extend the full toroidal length of the enclosure, is laid upon the joists 30'. Finally, the floor joists 30" are placed upon the second floor 29". By such a placement, the respective floors and joists are presented for assembly in a convenient manner as the coil 3 is unwound at the assembly location.

In FIG. 11b, a plurality of joists are shown as they would preferably be positioned prior to being coiled in the coil 3, in the layer as shown in the leftmost portion of FIG. 11a. Specifically, for convenience of manufacture and formation of coil 3, the various joists necessary for assembly of the completed enclosure can be made from a continuous longitudinally extending beam 34, with weakened areas 33, i.e., areas of lesser cross-sectional thickness or areas of perforation, defining the individual joists 30. Upon the unwinding of the coil 3, as schematically illustrated in FIG. 3a, the joists 30 are separated by breaking the beam 34 at weakened areas 33, as needed for assembly.

After completion of the toroidal enclosure, the enclosure can be appropriately caused to rotate about axis C to generate artificial gravity, if desired. The floors 30' and 30" are shown in FIG. 11a to appropriately orient the personnel and various accoutrements within the enclosure during such rotation.

FIG. 11c illustrates a further embodiment of the invention in which the floor 29''' is supported upon toroidal tubular elements 45a, 45b, and 45c, which have respective diameters, to support the floor at a desired level. The number of supporting toroidal elements 45a–45c is determined as needed. The interior of the elements 45a–45c can be utilized for necessary services, such as electricity, water, sewage, and/or other desired services.

Since the present invention is primarily directed to the superstructure of the enclosure, details of the interior for accommodation of various laboratories, habitation quarters, docking facilities, for example, are not shown. It is noted, however, that the interior of the toroidal enclosure can be appropriately segmented and separated by air locks, for example. Further, doors and windows can also be provided, as needed.

FIGS. 12–16 illustrate a second embodiment by which a toroidal enclosure can be constructed In this embodiment, the material which is to be coiled and transported to the assembly location is comprised of a plurality of ribs 35 extending transversely from opposite transverse sides of a longitudinally extending spine 36 at regular intervals, separated by respective cut-outs The spine 36 has a thickness greater than that of the ribs for appropriate reinforcement and riqidity.

For transportation to the assembly location, the material is wound into a coil 3', as schematically shown in FIG. 14. As shown therein, the coil 3' does not have an enlarged diameter near the center, such as that of coil 3, shown in FIG. 3a by dimension e, due to the use of the ribs 35, which can spread apart in the coiled configuration.

In the perspective view of FIG. 15, the enclosure of the second embodiment is partially shown, after uncoiling of the coil 3', but before the free ends of the various ribs are brought together. By bringing together the free ends of the various ribs, the toroidal shape of the enclosure is effected, around center C', as schematically illustrated in partial plan view in FIG. 16. As shown in FIG. 16, the spine 36 forms the outermost rim of the toroidal enclosure 1'. Therefore, a transverse toroidal segment is comprised by a pair of oppositely extending ribs 35. As shown in FIG. 16, any given segment is preferably defined by a width $L_2$ at the spine which tapers to a minimal width $L_1$ at the inner portion of the toroid.

It is contemplated that the material from which the ribs 35 and spine 36 is made is not prestressed either transversely or longitudinally. It is contemplated, however, that the free ends of longitudinally adjacent ones of the respective ribs 35 can be connected by an elastic element or cable 37 which, when the coil 3' is unwound, forces the ribs together, generally into the toroidal configuration of FIG. 16, by means of elastic return forces T'—T'.

Alternatively, prestressing could, if desired, be used in this embodiment. Prestressing would ensure the final assembly being accomplished automatically, as described above. In such an event, the aforementioned cable would complete the final locking of the assembly in place.

In the embodiment of FIGS. 12-16, although each of the adjacent ribs 35 can be seamed together with an adhesive, for example, it is contemplated that the toroidal enclosure 1' can be completed without providing airtight seams, particularly due to the relatively great number of seams that would be required to be made. If so, each compartment within the enclosure can be separately sealed and pressurized and the toroidal enclosure 1' would serve primarily as merely the superstructure for the enclosure.

Figure 17:
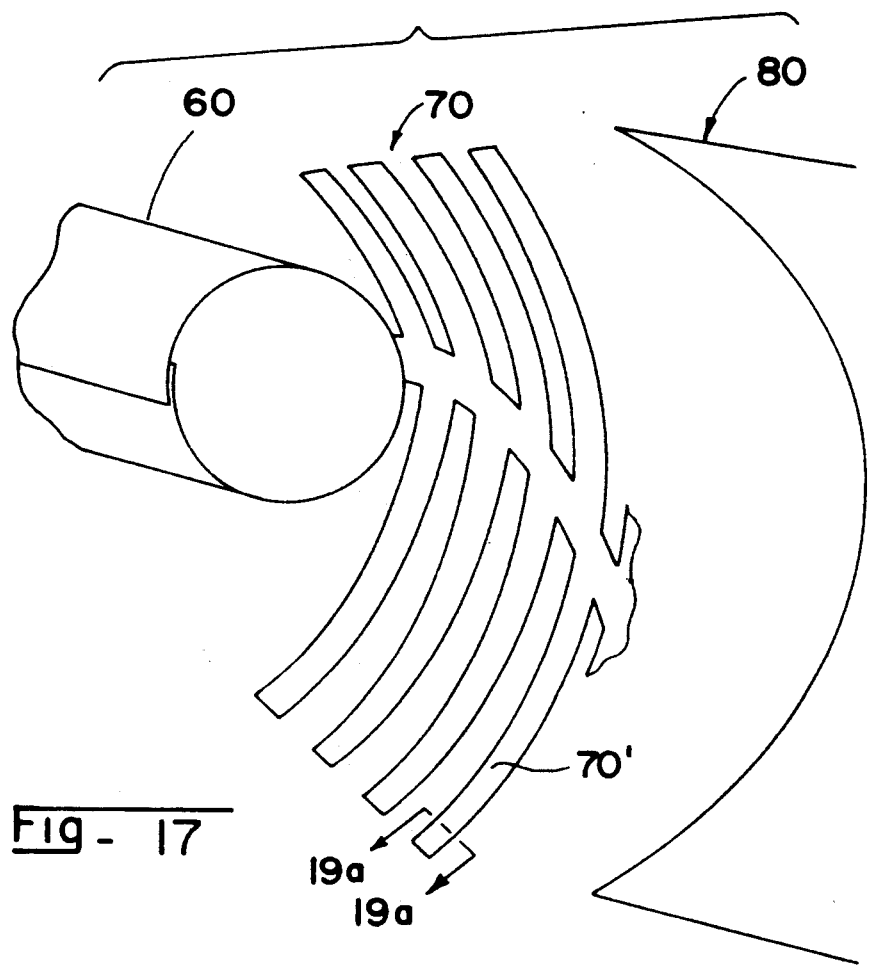
FIG. 17 is a partial exploded perspective view of a further embodiment of the invention, illustrating a layered toroidal enclosure.

It is contemplated that a multi-layered toroidal structure can be assembled by utilizing the structures described above to provide a predetermined wall thickness to secure the enclosure, particularly for use in a space environment, against collisions with high-speed particles which might tend to penetrate the wall of the enclosure. In such an embodiment, an example of which is illustrated in perspective in FIG. 17, the ribbed embodiment of the enclosure of FIGS. 12-16 can be alternately layered with the solid embodiment a sufficient number of times until the desired wall thickness is achieved.

Figure 18:
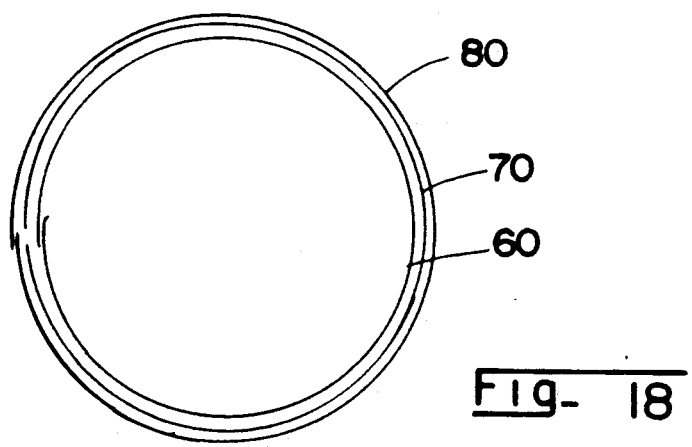
FIG. 18 illustrates a transverse cross-sectional view through the completed multi-layered enclosure of FIG. 17.

FIG. 18 shows a cross-section of a three layered assembly comprised of, e.g., an inner solid toroid 60, an intermediate ribbed toroid 70, and an outer solid toroid 80. Although the seams for each of the three toroids 60, 70, 80 are shown to be in the same relative position such the seams overlie each other, alternatively, the toroids can be chosen appropriately so that the locations of the respective longitudinally extending seams are varied, i.e., by using various ones of the embodiments of FIGS. 3a-3g, e.g., with regard to the solid toroids.

Figure 19A:
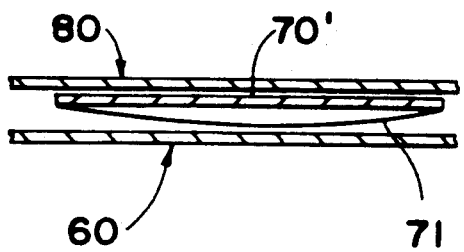
FIG. 19a illustrates, in a transverse cross-sectional view taken along lines 19a—19a of FIG. 17, an optional constructional detail of the invention usable in the embodiment of FIGS. 17, 18.
Figure 19B:
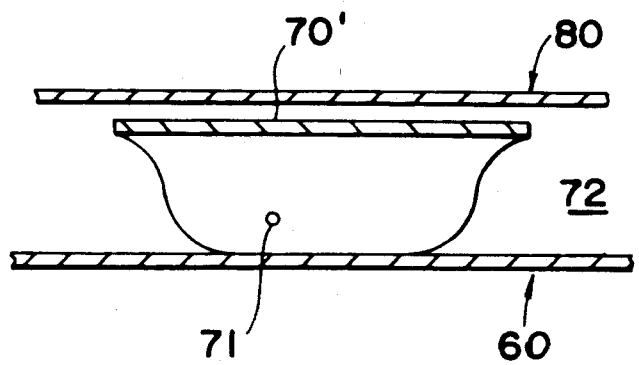
FIG. 19b illustrates the optional constructional detail of FIG. 19a, in which plural layers are spaced from each other.

FIGS. 19a and 19b, both of which are partial cross-sectional views of a three layered toroidal enclosure, in which a ribbed toroid is positioned between a pair of solid toroids 60, 80, show a means for spacing the outer solid toroid 80 further from the inner solid toroid 60, for insulation purposes, for example.

In FIG. 19a, in which a rib 70' of the intermediate ribbed toroid is shown in cross-section through a rib, a highly flexible bladder 71, made of rubber or nylon, e.g., is attached to the rib and extends along the rib, as well as along a transverse adjacent rib, on the opposite side of the spine of the ribbed toroid, to generally extend around the periphery of the tube. Similar bladders are to be provided on other ribs or on alternate or fewer ribs, as necessary, to provide reasonable structural integrity.

Subsequently, upon inflation of the bladders, the outer toroid 80 is spaced apart from inner toroid 60 to create a space therebetween, for insulation purposes, for example.

Figure 20:
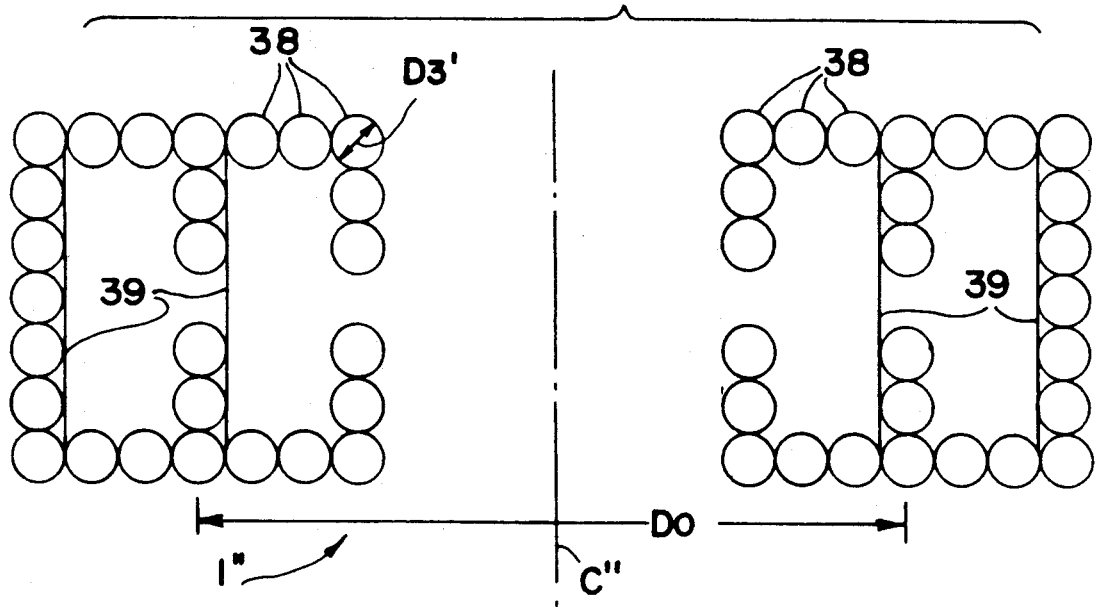
FIG. 20 is a schematic cross-sectional view of a further alternative embodiment in which a toroidal enclosure is formed by use of a plurality of smaller cross-sectional toroids connected together.

FIG. 20 illustrates a third embodiment of the toroidal enclosure of the present invention which is comprised of a plurality of tubular toroidal enclosures 38, which are of substantially the same configuration as that of tubular toroidal enclosure 1 of the first embodiment, but of much smaller internal diameter $D_3'$. As shown in FIG. 20, the tubular toroidal enclosure 1" is centered around axis C", preferably having the same diameter $D_o$ as the aforementioned embodiments.

In the embodiment of FIG. 20, a plurality of tubular toroids 38 are uncoiled and joined together with adhesive, such as a double-sided aircraft tape, and/or with pop rivets, to form a composition structure, until the structure is completed and then sealed.

Each toroid 38 is filled with air after it is completed and sealed by adhesive and/or other means, as mentioned above. Thereafter, the entire composite enclosure 1" is sealed and also filled with air.

As also shown in FIG. 20, a floor or a number of floors 39 are positioned, as well as openings for doors and windows, as desired. Further certain of the tubes 38 can be dedicated for housing the necessary utilities, such as electrical wiring, effluent, and water storage, etc.

FIGS. 21-24 illustrate a further embodiment of the invention, which differs from the preceding embodiments in that the tubular sections 82, 92, 102, 112, etc., from which the toroidal enclosure 1''' is composed, are not prestressed in the sense of that of the coils in the embodiments described above.

Specifically, FIG. 21 illustrates tubular sections 82, 92, 102, 112, in transverse cross-section, in a collapsed telescoped configuration. Although only four sections are shown, this number is intended merely for the purposes of simplicity and convenience of this description and many more such sections are contemplated to comprise the completed enclosure, as will be described below.

Each tubular section is contemplated to have a geometrically identical shape, in a relaxed condition, as illustrated in perspective in FIG. 23. For the purpose of illustration, the tubular section 92 is referred to in FIG. 23. Along the length of section 92 is a slit 95 which permits the section to be compressed and overlapped to the extent necessary, to collapse it within a plurality of similar sections, as shown in FIG. 21. For example, since section 92 is collapsed within section 82, the edges of slit 95 would be compressed together somewhat, and perhaps overlapped, while telescopically collapsed therein. Likewise, the edges of the slit (not illustrated) in tubular section 102 would be compressed and overlapped together somewhat more than those of section 92, since section 102 is to be collapsed within section 95. However, upon extension of the tubular sections, as shown in FIG. 22, each section is free to resume its identical shape. That is, as section 92, e.g., is extended from within section 82, the compression of the edges of slit 95 is relieved and section 92 can assume the shape shown in FIG. 23.

As each section extends, cooperating internal lips on the sections restrain the respective sections from extending beyond the end of adjacent sections, as illustrated in FIG. 22. Specifically, as shown in FIGS. 21 and 22, section 82 has an external peripheral lip 83 at its left end and an internal peripheral lip 84 at its right end. As section 92 extends rightwardly in FIG. 22, external lip 93 of section 92 engages with internal lip 84 of section 82. Likewise, external lip 103 of section 102 engages with internal lip 94 of section 92, external lip 113 of section 112 engages with internal lip 104 of section 102, etc.

To permit the extension of the sections to form a toroidal enclosure, the transverse plane defined by the end of each section can be made to be slightly less than 90° to the longitudinal axis of the section. For example, if 360 sections were to be used in forming the completed enclosure in this embodiment, as shown in FIG. 24, angle α, between the end plane and the longitudinal axis of the tubular section (see FIG. 21) would be 89°, thereby permitting each adjacent section to form a 1° angle with respect to the other. Thereby, the toroid would be completed upon the right internal peripheral lip of the 360th section being engaged with external peripheral lip 83 of first section 82. An internal longitudinal guide, or reference mark, not shown in the drawings, could be utilized with each section to prevent any relative movement of adjacent sections as they are telescoped and/or to permit the assembler(s) of the toroid to ensure accuracy and alignment in the formation of the toroid.

It is contemplated that instead of all sections being telescoped into a single telescopically collapsed assembly, a plurality of collapsed assemblies, like that of FIG. 21 could be used to complete the toroidal enclosure of FIG. 24. In this case, the peripheral lips of the respective end sections of adjacent assemblies would be engaged to connect the plurality of assemblies after extension.

Further, to effect the extension of the assemblies, e.g., to effect the extension from the collapsed configuration shown in FIG. 21 to the extended configuration shown in FIG. 23, air pressure could be introduced within the collapsed assembly, after temporarily sealing the ends of the assembly with appropriate end seals 150, 151, against which the air pressure within the assembly would effect the extension of the assembly as shown schematically by the oppositely directed arrows in FIG. 21. Upon extension, the seals would be removed to permit the connection of adjacent assemblies.

After completion of the toroidal enclosure of the embodiment of FIGS. 21–24, the interior of the enclosure could be completed using various ones of the techniques described above. The seams at the slits of each section could be made and sealed as described above as well.

Whether the completed enclosure is formed from one or multiple sections, or coils, in accordance with any of the embodiments described above, it is contemplated that the completed toroid curves both transversely and longitudinally in a generally continuous manner along the entire circumference of the toroid, as schematically shown in FIGS. 2 and 24, for example.

Finally, although the invention has been described with reference of particular means, materials and embodiments, it is to be understood that the invention is not limited to the particulars disclosed and extends to all equivalents within the scope of the claims.

I claim:

1. An apparatus for use in constructing a toroidal enclosure, said apparatus comprising at least a quantity of material movable between a coiled transport position, in which said quantity of material is formable into a coil, to an uncoiled assembling position, in which said coil is formable into at least a partial toroid, said quantity of material comprising a first end portion which, in said coiled transport position, is located within an interior of said coil, a second end portion which, in said coiled transport position, is located exteriorly of said coil, and a pair of edge portions longitudinally extending between said first end portion and said second end portion, wherein said material has a shape and a flexibility such that, as said quantity of material moves from said coiled transport position to said uncoiled assembling position, said material is adapted to transversely curve and longitudinally curve in a generally continuous manner from said first end portion to said second end portion, said apparatus further comprising a floor and a rigidifying structure for said floor, said rigidifying structure comprising a plurality of elements adapted to be assembled within said enclosure.

2. The apparatus of claim 1, wherein said material is elastic, whereby, as said quantity of material moves from said coiled transport position to said uncoiled assembling position, said material becomes transversely curved by elastic recovery of said material.

3. The apparatus of claim 1, wherein, in said uncoiled assembling position, said quantity of material forming said longitudinal curve extends around a radius of curvature.

4. The apparatus of claim 1, wherein said transversely and longitudinally curved material is adapted to generate a semi-toroid, whereby a plurality of said coils of material are adapted to form a toroid by respective ones of said edge portions of respective ones of said coils are connected together, thereby forming said enclosure.

5. The apparatus of claim 1, wherein, in said coiled transport position, said coil of said material generally forms a cylinder having a cross-sectional dimension which increases in a direction from either of two ends of said cylinder toward a central portion of said cylinder.

6. The apparatus of claim 1, wherein said material is plastic.

7. The apparatus of claim 1, further comprising a second floor, generally parallel to said floor.

8. The apparatus of claim 1, wherein said enclosure is capable of being used as a satellite and wherein said coil of material has a length less than or equal to 18 meters and a maximum diameter of less than or equal to 4.6 meters.

9. The apparatus of claim 1, wherein said first end portion is adapted to be connected at least to a member selected from a group consisting of (1) said second end portion and (2) an end portion of a second coil of material, in said uncoiled assembling position, for forming said toroidal enclosure.

10. The apparatus of claim 1, wherein said transversely and longitudinally curved material is adapted to generate a toroid by said edge portions being connected together, thereby forming said enclosure.

11. The apparatus of claim 10, whereby said edge portions are adapted to be overlapped, said apparatus further comprising means for facilitating connection of said edge portions.

12. The apparatus of claim 11, wherein said means for facilitating connection of said edge portions comprises a plurality of grip hook members extending from one of said pair of edge portions and a complementary plurality of grip slots located in the other of said pair of edge portions for receiving respective ones of said grip hook members.

13. The apparatus of claim 12, wherein said means for facilitating connection of said edge portions further comprises providing said pair of edge portions with complementary corrugations in transverse cross section.

14. The apparatus of claim 12, further comprising a contact adhesive adapted to be placed between said overlapped edge portions.

15. The apparatus of claim 12, wherein each of said pair of edge portions has a respective terminal edge, and wherein said plurality of grip hook members extend in a transverse direction away from said terminal edge of said one edge portion to thereby increase a holding force of said plurality of grip hook members within said grip slots in response to a force tending to move said overlapped edge portions apart.

16. The apparatus of claim 1, wherein said material is metal.

17. The apparatus of claim 16, wherein said metal is steel.

18. The apparatus of claim 1, wherein said enclosure comprises an interior surface having a pair of opposite side walls, wherein said floor comprises at least one flat member extending from one of said pair of opposite side walls to another of said pair of opposite side walls, and wherein said rigidifying structure for said floor comprises a plurality of joists adapted to be positioned to rigidify said floor.

19. The apparatus of claim 18, wherein said rigidifying structure for said floor comprises a plurality of floor joists adapted to be affixed to said floor and a plurality of end joists adapted to be affixed to said interior surface of said enclosure and adapted to be affixed to said floor joists.

20. The apparatus of claim 18, wherein said generally flat member and said plurality of joists are adapted to be positioned within said coil.

21. The apparatus of claim 20, wherein said of said plurality of joists has a predetermined length and a generally corrugated cross-sectional shape.

22. The apparatus of claim 21, wherein said joists are adapted to be positioned within said coil to longitudinally curve and to transversely flatten from said generally corrugated cross-sectional shape.

23. The apparatus of claim 20, wherein said generally flat member and said plurality of joists are adapted to extend with said material and be coiled with said coil in said coiled transport position of said material.

24. The apparatus of claim 23, wherein said plurality of joists comprises a longitudinally extending quantity of a unitary material formed with weakened areas for defining said joists, whereby joists are adapted to be separated from said unitary material at said weakened areas.

25. An apparatus for use in constructing a toroidal enclosure, said apparatus comprising at least a quantity of material movable between a coiled transport position, in which said quantity of material is formable into a coil, to an uncoiled assembling position, in which said coil is formable into at least a partial toroid, said quantity of material comprising a first end portion which, in said coiled transport position, is located within an interior of said coil, a second end portion which, in said coiled transport position, is located exteriorly of said coil, and a pair of edge portions longitudinally extending between said first end portion and said second end portion, wherein said material has a shape and a flexibility such that, as said quantity of material moves from said coiled transport position to said uncoiled assembling position, said material is adapted to transversely curve and longitudinally curve in a generally continuous manner from said first end portion to said second end portion, wherein each of said edge portions comprises a series of cut-outs in said coiled transport position of said quantity of material, forming a series of spaced apart ribs in said coiled transport position of said quantity of material, and wherein said apparatus further comprises means for moving said series of spaced apart ribs together on each respective edge portion in said uncoiled assembling position of said quantity of material.

26. The apparatus of claim 25, wherein said quantity of material further comprises a generally centrally positioned longitudinally extending spine and wherein said ribs extend in a transverse direction from said spine.

27. The apparatus of claim 25, wherein said means for moving said series of spaced apart ribs together comprises at least one cable uniting said series of ribs on each respective side of said material.

28. An assembly of parts capable of being assembled in constructing an enclosure, said assembly comprising:
a coil of material adapted to be uncoiled to an assembling position, said coil having a predetermined length and a predetermined diameter along said length, said material being prestressed to become transversely curved in said uncoiled assembling position;
a plurality of elements positioned with said coil, said plurality of elements having a size and shape enabling said elements to be adapted to be affixed to respective parts of said assembly within said enclosure in respective positions along the length of said material in said uncoiled assembling position of said material to constitute an internal structure for said enclosure;
said plurality of elements being coiled with said coil of material for permitting access to said elements for assembly of said elements to said respective parts as said material is uncoiled to said assembling position.

29. The assembly to claim 28, wherein said material is further prestressed to curve longitudinally in said uncoiled assembling position.

30. The assembly of claim 29, wherein, along said length of said coil, said diameter of said coil increases to a maximum diameter and then decreases to a diameter less than said maximum diameter.

31. The assembly of claim 29, wherein said material has a pair of opposite longitudinally extending edge portions, whereby said material is adapted to generate a generally toroidal shape by said edge portions being connected together, thereby forming said enclosure.

32. The assembly of claim 29, wherein said material has a pair of opposite longitudinally extending edge portions, whereby said material is adapted to generate a generally semi-toroidal shape, whereby a plurality of said coils of material are adapted to form a generally toroidal shape by respective ones of said edge portions of respective ones of said coils being connected together, thereby forming said enclosure.

33. The assembly of claim 29, wherein said material comprises a pair of edge portions which are adapted to be overlapped, said assembly further comprising means for facilitating connection of said edge portions.

34. The assembly of claim 30, wherein said means for facilitating connection of said edge portions comprises a plurality of grip hook members extending from one of said pair of edge portions and a complementary plurality of grip slots located in the other of said pair of edge portions for receiving respective ones of said grip hook members.

35. The assembly of claim 32, further comprising a contact adhesive adapted to be placed between said overlapped edge portions.

36. The apparatus of claim 32, wherein each of said pair of edge portions has a respective terminal edge, and wherein said plurality of grip hook members extend in a transverse direction away from said terminal edge of said one edge portion to thereby increase a holding force of said plurality of grip hook members within said grip slots in response to a force tending to move said overlapped edge portions apart.

37. The assembly of claim 30, wherein said means for facilitating connection of said edge portions further comprises providing said pair of edge portions with complementary corrugations in transverse cross section.

38. The assembly of claim 28, wherein, along said length of said coil, said diameter of said coil increases to a maximum diameter and then decreases to a diameter less than said maximum diameter.

39. A method of assembling an enclosure in the form of a toroid with the use of at least one coil of material, said at least one coil of material having a pair of longitudinally extending edge portions extending between opposite end portions, said at least one coil of material being prestressed to curve transversely and longitudinally in an uncoiled assembling position, said method comprising the steps of:
 (a) uncoiling at least said one coil of material to form a transversely and longitudinally curved shape;
 (b) connecting an edge portion of at least said one coil of material and another edge portion, said another edge portion being an edge portion of a member selected from the group consisting of (1) said one coil of material and (2) another coil of said at least one coil of material; and
 (c) connecting an end portion of at least said one coil of material and another end portion, said another end portion being an end portion of a member selected from the group consisting of (1) said one coil of material and (2) another coil of said at least one coil of material.

40. The method of claim 39, wherein one of said edge portions of at least said one coil of material includes a plurality of grip hook members and another of said edge portions of at least said one coil of material includes a complementary plurality of grip slots, and wherein said step of connecting said edge portions of said at least one coil comprises positioning said grip hook members within said grip slots.

41. The method of claim 40, further comprising the step of transmitting air to within said toroidal shape.

42. The method of claim 41, wherein said step of transmitting air to within said toroidal shape comprises transmitting air to within said toroidal shape at a pressure level for increasing a force retaining said grip hook members within said grip slots.

43. The method of claim 40, wherein said step of connecting edge portions comprises applying an adhesive to said edge portions.

44. The method of claim 39, wherein said step of connecting edge portions comprises applying an adhesive to said edge portions.

45. The method of claim 39, wherein each of said edge portions comprises a series of cut-outs in said material, forming a series of spaced apart ribs, wherein, between steps (a) and (b), said method further comprises the step of moving said series of spaced apart ribs together on each respective edge portion of said material.

46. The method of claim 39, wherein said method further comprises forming a plurality of toroidal shapes by performing steps (a) and (b) repeatedly with a respective plurality of coils of material, and wherein said method further comprises the step of affixing said plurality of toroidal shapes together.

47. The method of claim 46, wherein said step of affixing said plurality of toroidal shapes together comprises affixing said plurality of toroidal shapes adjacent each other to form a toroid having an shape defined by a plurality of said plurality of toroids.

48. The method of claim 46, wherein said step of affixing said plurality of toroidal shapes together comprises layering said plurality of toroidal shapes to thereby define a thickness of said enclosure.

49. The method of claim 39, further comprising, prior to step (a), the step of transporting at least said one coil of material to an altitude beyond earth's surface.

50. The method of claim 49, wherein said step of transporting at least said one coil of material comprises placing at least said one coil of material into earth orbit.

51. The method of claim 39, wherein said step of uncoiling at least said one coil of material comprises freeing each of said end portions of at least said one coil of material.

52. A method of assembling an enclosure with the use of at least one coil of material, said at least one coil of material having a pair of longitudinally extending edge portions extending between opposite end portions, said at least one coil of material being prestressed to curve transversely and longitudinally in an uncoiled assembling position, said method comprising the steps of:
 (a) uncoiling at least said one coil of material to form a transversely and longitudinally curved shape;
 (b) connecting edge portions of said at least one coil to form a toroidal shape; and
 (c) assembling a floor and a rigidifying structure for said floor within said toroidal shape.

53. The method of claim 52, wherein said floor and said rigidifying structure are located within said coil and said step of assembling a floor and said rigidifying structure comprises the step of uncoiling said material for gaining access to said floor and said rigidifying structure.

54. The method of claim 53, wherein said rigidifying structure comprises a plurality of joists which comprises a longitudinally extending quantity of a unitary material formed with weakened areas for defining said joists, wherein said step of assembling a floor and a rigidifying structure comprises separating said joists from said unitary material at said weakened areas.

55. An enclosure in the form of a toroid constructed with the use of at least one coil of material, said at least one coil of material having a pair of longitudinally extending edge portions extending between opposite end portions, said at least one coil of material being prestressed to curve transversely and longitudinally in an uncoiled assembling position, said enclosure made by the process comprising the steps of:
 (a) uncoiling at least said one coil of material to form a transversely and longitudinally curved shape;
 (b) connecting an edge portion of at least said one coil of material and another edge portion, said another edge portion being an edge portion of a member selected from the group consisting of (1) said one coil of material and (2) another coil of said at least said one coil of material; and (c) connecting an end portion of at least said one coil of material and another end portion, said another end portion being an end portion of a member selected from the group consisting of (1) said one coil of material and (2) another coil of said at least one coil of material.

56. An enclosure in the form of a toroid, said enclosure comprising:

at least one quantity of material positioned in an uncoiled assembling position in the form of at least a partial toroid, said at least one quantity of material being prestressed to be transversely curved and longitudinally curved in said uncoiled assembling position;

said at least one quantity of material having a pair of edge portions and a pair of end portions;

one of said pair of edge portions being connected to an edge portion of a member selected from the group consisting of (1) said one coil of material and (2) another coil of said at least one coil of material; and one of said pair of end portions being connected to an end portion of a member selected from the group consisting of (1) said one coil of material and (2) another coil of said at least one coil of material.

* * * * *